(12) United States Patent
Aepli

(10) Patent No.: US 9,663,655 B2
(45) Date of Patent: May 30, 2017

(54) POLYAMIDE MOULDING COMPOSITION AND USE THEREOF

(71) Applicant: EMS-PATENT AG, Domat/Ems (CH)

(72) Inventor: Etienne Aepli, Domat/Ems (CH)

(73) Assignee: EMS-PATENT AG, Domat/Ems (CH)

( * ) Notice: Subject to any disclaimer, the term of this patent is extended or adjusted under 35 U.S.C. 154(b) by 0 days.

(21) Appl. No.: 14/681,669

(22) Filed: Apr. 8, 2015

(65) Prior Publication Data

US 2015/0291795 A1  Oct. 15, 2015

(30) Foreign Application Priority Data

Apr. 15, 2014 (EP) .................................. 14164801

(51) Int. Cl.
| | |
|---|---|
| C08G 69/26 | (2006.01) |
| C08L 51/00 | (2006.01) |
| C08L 77/00 | (2006.01) |
| B60C 1/00 | (2006.01) |
| C08K 3/40 | (2006.01) |
| C08L 77/06 | (2006.01) |
| C08L 77/02 | (2006.01) |
| C08L 77/08 | (2006.01) |

(52) U.S. Cl.
CPC .............. C08L 77/06 (2013.01); C08L 77/02 (2013.01); C08L 77/08 (2013.01); C08L 2201/08 (2013.01); C08L 2205/02 (2013.01); C08L 2205/03 (2013.01)

(58) Field of Classification Search
None
See application file for complete search history.

(56) References Cited

U.S. PATENT DOCUMENTS

| | | | |
|---|---|---|---|
| 4,218,351 A | 8/1980 | Rasmussen | |
| 5,288,799 A | 2/1994 | Schmid et al. | |
| 5,807,968 A * | 9/1998 | Heinrich | A43B 23/086 |
| | | | 523/102 |
| 2008/0167415 A1 | 7/2008 | Stoeppelmann et al. | |
| 2011/0040023 A1 * | 2/2011 | Buhler | C08G 69/265 |
| | | | 524/538 |
| 2012/0000562 A1 | 1/2012 | Hoffmann et al. | |

FOREIGN PATENT DOCUMENTS

| | | |
|---|---|---|
| DE | 1 720 832 A1 | 7/1971 |
| EP | 0 523 445 A2 | 1/1983 |
| EP | 1 942 147 A1 | 7/2008 |
| EP | 2 123 694 A1 | 11/2009 |
| EP | 2 402 224 A1 | 1/2012 |
| GB | 1122138 A | 7/1968 |

OTHER PUBLICATIONS

European Patent Office, Extended European Search Report in European Patent Application No. 14164801 (Oct. 8, 2014).
U.S. Appl. No. 10/536,494, filed Oct. 5, 2006.
U.S. Appl. No. 10/553,259, filed Jul. 24, 2006.
U.S. Appl. No. 11/950,964, filed Dec. 5, 2007.
U.S. Appl. No. 12/743,097, filed May 14, 2010.
U.S. Appl. No. 13/045,682, filed Mar. 11, 2011.
U.S. Appl. No. 13/186,785, filed Jul. 20, 2011.
U.S. Appl. No. 13/421,541, filed Mar. 15, 2012.
U.S. Appl. No. 13/481,451, filed May 25, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/205,667, filed Mar. 12, 2014.
U.S. Appl. No. 14/607,676, filed Jan. 28, 2015.
U.S. Appl. No. 14/663,105, filed Mar. 19, 2015.

* cited by examiner

*Primary Examiner* — Susannah Chung
*Assistant Examiner* — Robert T Butcher
(74) *Attorney, Agent, or Firm* — Leydig, Voit & Mayer, Ltd.

(57) ABSTRACT

The invention relates to a polyamide molding composition which comprises an amorphous polyamide, a partially crystalline, aliphatic polyamide and also glass fibers for reinforcement. Furthermore, the polyamide molding composition according to the invention comprises a polyamide made of a cycloaliphatic diamine and a dimerized fatty acid. The polyamide molding compositions according to the invention are used in the production of electrical or electronic components, housings or housing components.

20 Claims, No Drawings

POLYAMIDE MOULDING COMPOSITION AND USE THEREOF

CROSS-REFERENCE TO A RELATED APPLICATION

This application claims the benefit of European Patent Application No. 14164801.4, filed Apr. 15, 2014, the disclosure of which is incorporated herein by reference in its entirety.

The invention relates to a polyamide moulding composition which comprises an amorphous polyamide, a partially crystalline, aliphatic polyamide and also glass fibres for reinforcement. Furthermore, the polyamide moulding composition according to the invention comprises a polyamide made of a cycloaliphatic diamine and a dimerised fatty acid. The polyamide moulding compositions according to the invention are used in the production of electrical or electronic components, housings or housing components.

For the production of electrical or electronic components and also housings or housing components, in particular for portable electronic devices, a large number of modified polyamide moulding compositions are known from the state of the art. An important approach for modification is hereby to optimise the mechanical properties, inter alia the toughness, of these plastic materials.

Thus partially crystalline, thermoplastically processible, partially aromatic copolyamides are known from EP 2 123 694 A1, which are based on a combination of terephthalic acid, a dimerised fatty acid and also an aliphatic diamine.

Likewise, the use of dimerised fatty acids for polyamides which are used as adhesives is known. There are included herein DE 1 720 832 and U.S. Pat. No. 4,218,351.

Starting from this state of the art, it was the object of the present invention to optimise fibre-reinforced polyamide moulding compositions with respect to toughness (measured as impact strength, notch impact strength or breaking elongation), without thereby greatly impairing the rigidity and strength.

This object is achieved by the polyamide moulding composition having the features of claim 1. In claim 14, uses according to the invention are indicated. The further dependent claims reveal advantageous developments.

According to the invention, a polyamide moulding composition with the following composition is provided:
A) from 10 to 86% by weight of at least one amorphous polyamide,
B) from 2 to 30% by weight of at least one partially crystalline aliphatic polyamide,
C) from 2 to 40% by weight of at least one polyamide formed from at least one cycloaliphatic diamine selected from the group consisting of bis-(4-amino-3-methylcyclohexyl)methane (MACM), bis-(4-aminocyclohexyl)methane (PACM), bis-(4-amino-3-ethylcyclohexyl)methane (EACM), bis-(4-amino-3,5-dimethylcyclohexyl)methane (TMDC), 2,2-(4,4'-diaminodicyclohexyl)propane (PACP) or mixtures thereof and at least one dimerised fatty acid,
D) from 10 to 70% by weight of glass fibres,
E) from 0 to 40% by weight of particulate fillers and also
F) from 0 to 10% by weight of further additives,
the quantity proportions of components D) and E) adding up to at most 70% by weight and the quantity proportions of components A) to F) up to 100% by weight.

With less than 2% by weight of polyamide C), no further improvement in toughness can be observed. If, in contrast, more than 40% by weight of polyamide C) is used, both the rigidity (measured as modulus of elasticity in tension) and the strength (measured as tearing strength) are reduced too greatly.

The polyamide moulding composition comprises preferably 12 to 61.8% by weight, particularly preferred 14 to 44.6% by weight, of the at least one amorphous polyamide A.

The at least one partially crystalline aliphatic polyamide B) can be contained preferably in a quantity of 5 to 25% by weight, particularly preferred of 10 to 20% by weight.

With respect to the at least one polyamide C), preferably 3 to 30% by weight, particularly preferred 5 to 25% by weight, are contained in the moulding composition.

The proportion of glass fibres in the moulding composition is preferably in the range of 30 to 69.9% by weight, particularly preferred of 40 to 69.8% by weight.

The further fillers can be contained preferably in a proportion of 0.1 to 30% by weight, particularly preferred 0.2 to 25% by weight, in the moulding composition. The weight proportion of the further additives in the moulding composition is preferably from 0.1 to 7% by weight, particularly preferred from 0.2 to 5% by weight.

In all these preferred quantity proportions, it applies in general that the quantity proportions of components D) and E) add up to at most 70% by weight and the quantity proportions of components A) to F) add up to 100% by weight.

For formation of polyamide C), preferably at least one dimerised fatty acid with 30 to 50 C atoms, preferably with 35 to 45 C atoms and particularly preferred with 36 or 44 C atoms, is used.

A preferred embodiment of the polyamide composition according to the invention provides that polyamide C) is formed from at least one cycloaliphatic diamine selected from the group consisting of bis-(4-amino-3-methylcyclohexyl)methane (MACM), bis-(4-amino-3,5-dimethylcyclohexyl)methane (TMDC) or mixtures hereof and at least one dimerised fatty acid.

For particular preference, polyamide C) is formed from at least one cycloaliphatic diamine selected from the group consisting of bis-(4-amino-3-methylcyclohexyl)methane (MACM), bis-(4-amino-3,5-dimethylcyclohexyl)methane (TMDC) or mixtures hereof and a dimerised fatty acid with 36 C atoms.

The relative viscosity (RV) of polyamides C) is 1.35 to 1.85, preferably 1.40 to 1.75, particularly preferred 1.45 to 1.60, measured with 0.5 g in 100 ml m-cresol at 20° C.

The amorphous polyamide A) is preferably selected from the group consisting of PA 6I, PA 6I/6T, PA 6I/6T/6N, PA MXDI/6I, PA MXDI/XDT/6I/6T, PA MXDI/12I, PA MXDI, PA MACM10, PA MACM12, PA MACM14, PA MACM18, PA NDT/INDT, PA TMDC12, PA MACMI/12, PA MACMT/12, PA MACMI/MACM12, PA MACMT/MACM12, PA MACMI/MACMN, PA MACMT/MACMN, PA MACMI/MACM36, PA MACMT/MACM36, PA MACMI/MACMT/12, PA 6I/MACMI/12, PA 6I/6T/MACMI/MACMT, PA 6I/6T/MACMI/MACMT/12, PA MACM6/11, PA 6I/6T/MACMI/MACMT/MACM12/6I2, PA MACMI/MACMT/MACM12/12, PA MACMI/MACMT/MACM12, PA 6I/6T/6N/MACMI/MACMT/MACMN, PA MACM10/10 and mixtures or copolymers hereof, the MACM being able to be replaced up to at most 25% by mol, relative to the sum of molar proportions of all the monomers of 100% by mol, by PACM and/or the laurinlactam entirely or partially by caprolactam.

In the dynamic difference calorimetry (Differential Scanning calorimetry, DSC) according to ISO 11357, the amorphous polyamides A) show, at a heating rate of 20 K/min, a melting heat of at most 5 J/g, preferably of at most 3 J/g, particularly preferred of 0 to 1 J/g.

The amorphous polyamides A) show no melting point on the basis of their amorphism.

For particular preference, the amorphous polyamide A) is selected from the group consisting of PA MACM12, PA MACM12/PACM12, PA MACMI/12, PA MACMI/MACMT/12, PA 6I/6T/MACMI/MACMT/12, PA 6I/6T/MACMI/MACMT/PACMI/PACMT/12, PA MACMI/MACMT/MACM12 and mixtures hereof.

The proportion of PACM in the PA MACM12/PACM12 is preferably at most 25% by mol, the sum of the molar proportions of all the monomers producing 100% by mol. PA MACM12/PACM12 with at most 25% by mol of PACM12 are amorphous and hence do not show a melting point.

Amongst the PA MACMI/12, those with a proportion of laurinlactam of 15 to 50% by mol are preferred, the sum of the molar proportions of all the monomers producing 100% by mol. PA MACMI/12 with a proportion of laurinlactam of 20 to 40% by mol are particularly preferred. PA MACMI/12 with a proportion of laurinlactam of 19% by mol or 35% by mol are particularly preferred.

Amongst the PA MACMI/MACMT/12, those with an equimolar ratio of isophthalic acid to terephthalic acid and a proportion of laurinlactam of 15 to 40% by mol are preferred, the sum of the molar proportions of all the monomers producing 100% by mol. For particular preference, the PA MACMI/MACMT/12 have an equimolar ratio of isophthalic acid to terephthalic acid and a proportion of laurinlactam of 20 to 30% by mol. For particular preference, the PA MACMI/MACMT/12 has the molar ratio of 38/38/24.

Amongst the PA 6I/6T/MACMI/MACMT/12, those with an equimolar ratio of isophthalic acid to terephthalic acid and a proportion of laurinlactam of 1 to 25% by mol are preferred, the sum of the molar proportions of all the monomers producing 100% by mol. For particular preference, the PA 6I/6T/MACMI/MACMT/12 have an equimolar ratio of isophthalic acid to terephthalic acid and a proportion of laurinlactam of 2 to 15% by mol. For particular preference, the PA 6I/6T/MACMI/MACMT/12 has the molar ratio of 34/34/14/14/4.

Amongst the PA 6I/6T/MACMI/MACMT/PACMI/PACMT/12, those with an equimolar ratio of isophthalic acid to terephthalic acid and a proportion of laurinlactam of 1 to 25% by mol are preferred, the sum of the molar proportions of all the monomers producing 100% by mol. For particular preference, the PA 6I/6T/MACMI/MACMT/PACMI/PACMT/12 have an equimolar ratio of isophthalic acid to terephthalic acid and a proportion of laurinlactam of 2 to 15% by mol. For particular preference, the PA 6I/6T/MACMI/MACMT/PACMI/PACMT/12 have an equimolar ratio of isophthalic acid to terephthalic acid, a proportion of PACM of 2 to 7% by mol and a proportion of laurinlactam of 2 to 7% by mol.

Amongst the PA MACMI/MACMT/MACM12, those with an equimolar ratio of isophthalic acid to terephthalic acid and a proportion of dodecanedioic acid of 30 to 60% by mol are preferred, the sum of the molar proportions of all the monomers producing 100% by mol. For particular preference, the PA MACMI/MACMT/MACM12 have an equimolar ratio of isophthalic acid to terephthalic acid and a proportion of dodecanedioic acid of 40 to 50% by mol. For particular preference, the PA MACMI/MACMT/MACM12 has the molar ratio of 27/27/46.

If the polyamides comprise only diacids and diamines, then their molar proportions add up to 50% by mol for the sum of all diamines and 50% by mol for the sum of all diacids and the sum of diamine and diacid proportions produces 100% by mol for the polyamide.

If, in addition to diacids and diamines, the polyamides also comprise lactams or α,ω-amino acids at x % by mol, then the sum of all the diamines is still only (50-0.5 x) % by mol and the sum of all the diacids is (50-0.5 x) % by mol, relative to 100% by mol of polyamide.

In the quantity data relating to the diacids and diamines of the polyamides, it always applies that the sum of the molar proportions of all the diamines is equal to the sum of the molar proportions of all the diacids.

The quantity data with respect to the monomers should thereby be understood such that a corresponding molar ratio of these monomers used in the polycondensation is also found again in the polyamides produced in this way by polycondensation.

The relative viscosity (RV) of the amorphous polyamides A) is 1.35 to 2.15, preferably 1.40 to 1.80, particularly preferred 1.45 to 1.60, measured with 0.5 g in 100 ml m-cresol at 20° C.

The at least one partially crystalline, aliphatic polyamide B) is preferably selected from the group consisting of PA 6, PA 46, PA 49, PA 410, PA 411, PA 412, PA 413, PA 414, PA 415, PA 416, PA 418, PA 436, PA 66, PA 69, PA 610, PA 611, PA 612, PA 613, PA 614, PA 615, PA 616, PA 617, PA 618, PA 1010, PA 66/6, PA 6/66/12, PA 6/12, PA 11, PA 12, PA 912, PA 1212, 6T/6I, MXD6, MXD6/MXDI, MXD9, MXD10, MXD11, MXD12, MXD13, MXD14, MXD15, MXD16, MXD17, MXD18, MXD36, PACM9, PACM10, PACM11, PACM12, PACM13, PACM 14, PACM15, PACM16, PACM17, PACM18, PACM36, polyether amides, polyether ester amides, polyester amides and mixtures or copolymers thereof, in particular PA 6, PA 69, PA 610, PA 612, PA 614, PA 1010, PA 1212, PA 6/66/12, PA 6/66, PA 6/12, PA 11, PA 12, polyether amides, polyether ester amides and mixtures or copolymers thereof.

The relative viscosity (RV) of the partially crystalline, aliphatic polyamides B) is 1.50 to 2.30, preferably 1.55 to 1.95, particularly preferred 1.60 to 1.70, measured with 0.5 g in 100 ml m-cresol at 20° C.

Adjustment of the relative viscosity can be effected by control of the polycondensation of polyamides A), B) or C) in a manner known to the person skilled in the art with difunctional or monofunctional amines or carboxylic acids.

The glass fibres D) contained in the polyamide moulding composition according to the invention are preferably selected from endless fibres and/or short glass fibres. In the case of short glass fibres, these preferably have a length of 0.2 to 20 mm, particularly preferred of 2 to 12 mm.

A preferred embodiment of the polyamide moulding compositions according to the invention provides that the cross-section of the glass fibres is round, the glass fibres preferably having a diameter of 3 to 20 μm, particularly preferred 3 to 15 μm and very particularly preferred 3 to 8 μm.

A further preferred embodiment of the polyamide moulding compositions according to the invention provides that the glass fibres are flat glass fibres and have an oval, elliptical, polygonal or rectangular cross-section. For these fibres, the fibre length is preferably in the range of 3 to 40 μm. The length of the subsidiary cross-sectional axis of the flat glass fibres is preferably 3 to 20 μm, particularly preferred 4 to 10 μm. The length of the main cross-sectional axis of the flat glass fibres is preferably 6 to 40 μm, particularly preferred 12 to 30 μm. Furthermore, the flat glass fibres have an aspect ratio, i.e. the ratio of the main cross-sectional axis to the subsidiary cross-sectional axis, in the range of 1.5 to 8, particularly preferred of 2 to 6 and very particularly preferred of 3 to 5.

The particulate fillers E) of the polyamide moulding composition according to the invention are preferably selected from the group consisting of: talcum, mica, silicates, quartz, wollastonite, kaolin, silicic acids, magnesium carbonate, magnesium hydroxide, chalk, ground or precipitated calcium carbonate, lime, feldspar, inorganic pigments, such as e.g. barium sulphate, zinc oxide, zinc sulphide, lithopones and titanium dioxide (rutile, anatase), iron oxide, iron-manganese oxide, metal oxides, in particular spinels, such as e.g. copper-iron spinel, copper-chromium oxide, zinc-iron oxide, cobalt-chromium oxide, cobalt-aluminium oxide, magnesium-aluminium oxide, copper-chromium-manganese mixed oxides, copper-manganese-iron mixed oxides, rutile pigments, such as titanium-zinc rutile, nickel-antimony titanate, chromium-antimony titanate, hard- or soft-magnetic metals or alloys or ceramics, hollow spherical silicate fillers, aluminium oxide, boron nitride, boron carbide, aluminium nitride, calcium fluoride and mixtures hereof. The fillers can also be surface-treated.

The particulate fillers E) preferably have an average particle size (D50) in the range of 0.1-40 μm, preferably in the range of 0.2-20 μm, in particular in the range of 0.3-10 μm.

For particular preference, inorganic white pigments are used as particulate fillers E). It is preferred in particular that the particulate fillers E) are formed exclusively from these white pigments. In this case, component E) is or consists exclusively of the inorganic white pigments, selected from the group of barium sulphate, zinc oxide, zinc sulphide, lithopones and titanium dioxide (rutile, anatase), the white pigments preferably having an average particle size (D50) in the range of 0.1-40 μm, particularly preferred in the range of 0.1-20 μm, very particularly preferred in the range of 0.1-10 μm.

Furthermore, the thermoplastic polyamide moulding compositions according to the invention can comprise, in addition, additives F) which are common and generally known to the person skilled in the art, which additives are selected preferably from the group consisting of stabilisers, age-protecting agents, antioxidants, antiozonants, light-stability agents, UV stabilisers, UV absorbers, UV blockers, inorganic heat stabilisers, in particular based on copper halides and alkali halides, organic heat stabilisers, conductivity additives, carbon black, optical brighteners, processing aids, nucleation agents, crystallisation accelerators, crystallisation inhibitors, flow aids, lubricants, mould-release agents, plasticisers, pigments (different from white pigments), colourants, marking materials and mixtures hereof.

The polyamide moulding compositions according to the invention are used for the production of moulded articles, in particular parts of an electrical or electronic component, of a housing or of a housing component, preferably housings or housing parts for portable electronic devices, household appliances, household machines, devices and apparatus for telecommunication and consumer electronics, interior and exterior parts in the automobile sector and in the field of other transport means, interior and exterior parts, preferably with a portable or mechanical function in the field of electrics, furniture, sport, mechanical engineering, the sanitary and hygiene field, medicine, energy- and drive technology, particularly preferred mobile telephones, smart phones, organisers, laptop computers, notebook computers, tablet computers, radios, cameras, clocks, calculators, devices for playing music or video, navigation devices, GPS devices, electronic picture frames, external hard disks and other electronic storage media.

According to the invention, it is particularly preferred that the polyamide moulding composition is free of olefinic impact modifiers and elastomers, in particular free of polyolefins. Surprisingly, it was in fact able to be shown that, even in the absence of impact modifiers, significantly improved toughness could be established on the basis of the presence of component C).

The dimerised fatty acid of components C) has an acid value in the range of 145-210 mg KOH/g, preferably in the range of 192-200 mg KOH/g. Its content of monofunctional acid is at most 5%, of bifunctional acid at least 92% and of trifunctional acid at most 4%. The acid value or the content of the various acids is measured according to AOCS Te 1a-64 or AOCS Tf 5-91. Products are possible, for example, with 36 carbon atoms, as are obtainable under the trade name Pripol from Croda, in particular Pripol 1013, 1012, 1009 or 1006 (with 44 carbon atoms), or under the trade name Empol from Cognis, in particular Empol 1012, 1016 or 1062, or under the trade name Radiacid 0970 from Oleon, or products with 44 carbon atoms, for example Pripol 1004 from Croda.

The spellings and abbreviations used for polyamides and the monomers thereof correspond to the ISO standard 1874-1:1992.

MACM stands for the term bis-(4-amino-3-methylcyclohexyl)methane (CAS no. 6864-37-5). PACM stands for the term bis-(4-aminocyclohexyl)methane (CAS no. 1761-71-3). EACM stands for the term bis-(4-amino-3-ethylcyclohexyl)methane (CAS no. 1064114-65-3), TMDC stands for the term bis-(4-amino-3,5-dimethylcyclohexyl)methane (CAS no. 65962-45-0), PACP stands for the term 2,2-(4,4'-diaminodicyclohexyl)propane (CAS no. 3377-24-0).

Production of Polyamides C)

The production of polyamides C) is effected in the known manner in known agitatable pressure autoclaves with a receiving vessel and a reaction vessel:

In the receiving vessel, deionised water is received and the monomers and additives (e.g. condensation catalysts, chain regulators, defoamers, stabilisers) are added. Thereafter, the process of making inert takes place multiple times with nitrogen. With agitation, heating takes place to 150 to 200° C. at the adjusting pressure in order to obtain a homogeneous solution. This solution is pumped through a screen into the reaction vessel and is heated there to the desired reaction temperature of 260 to 290° C. at a pressure of at most 20 bar. The batch is retained in the pressure phase for 0.5 to 4 hours at the reaction temperature. In the subsequent expansion phase, the pressure is reduced to atmospheric pressure within 1 to 4 hours, the temperature being able to drop slightly. In the following degassing phase, the batch is retained at atmospheric pressure for 0.5 to 3 hours at a temperature of 260 to 280° C. The polymer melt is discharged in strand form, cooled in the water bath at 10 to 80° C. and subsequently granulated. The granulate is dried for 12 to 48 hours at 80 to 120° C. under nitrogen or in a vacuum to a water content of below 0.1% by weight.

Production of the Polyamide Moulding Compositions

For the production of the polyamide moulding composition, components A) to D) and possibly E) and/or F) are mixed (compositioned) on normal compositioning machines, such as e.g. single- or twin-shaft extruders or screw kneaders, in the polymer melt. The components are thereby metered in fact individually into the feed or into a side feeder. Components A) to C) and possibly components E) or F) can also be supplied in the form of a dry blend. Generally, the reinforcing component D) and possibly component E) are metered into the melt individually via gravimetric metering scales or side feeders.

Component F) can be introduced directly or in the form of master batches. The carrier material of the master batches preferably concerns a polyamide. Amongst the polyamides, in particular PA 6, PA 11, PA 12, PA 6/12 or PA MACMI/12 are suitable.

For the dry blend production, the dried granulates of polyamides A) to C) and possibly the further additives F) are mixed in a closed container. This mixture is homogenised for 10-40 minutes by means of a tumble mixer, eccentric mixer or tumbler drier. In order to avoid moisture absorption, this can be effected under a dry protective gas.

The compositioning is effected at set cylinder temperatures of 70 to 100° C. for the first housing and 230° C. to 320° C. for the remaining housings. A vacuum can be applied in front of the nozzle or atmospheric degassing can take place. The melt is discharged in strand form, cooled in the water bath at 10 to 80° C. and subsequently granulated. The granulate is dried for 12 to 24 hours at 80 to 120° C. under nitrogen or in a vacuum to a water content of below 0.1% by weight.

The subject according to the invention is intended to be explained in more detail with reference to the subsequent examples without wishing to restrict said subject to the specific embodiments shown here.

EXAMPLES

Production of PA MACM36 as Example for the Production of Polyamide C

In the receiving vessel of a 300 l pressure autoclave, 42 kg deionised water is received and 52.66 kg dimeric fatty acid is mixed in. Thereafter, 22.23 kg bis-(3-methyl-4-aminocyclohexyl)methane (MACM), 15 g Antifoam RD, 10% by weight of emulsion (defoamer), 8 g phosphinic acid (condensation catalyst) and at the end 70 g benzoic acid (chain regulator) is added. Thereafter, the process takes place as follows:

- after being made inert 10 times, heating takes place to 190° C. The homogeneous solution is pumped at 190° C. through a screen into the reaction vessel.
- with agitation, the batch there is heated to 270° C. and retained in the pressure phase at 20 bar for 1 hour. Within 2 hours, expansion takes place to atmospheric pressure and subsequently degassing takes place at 270° C. for 2 hours.
- the polymer melt is discharged, cooled in the water bath (20° C.) and granulated. The granulate is dried at 80° C. in a vacuum (30 mbar) for 24 hours to a water content of below 0.1% by weight.

The relative viscosity of the product was 1.54.

Production of the Polyamide Moulding Composition of Example E4

The dried granulates of polyamides A), B) and C) were mixed together with the white pigment and the two heat stabilisers to form a dry blend, in fact in the ratio indicated in table 1. This mixture (40 kg) is homogenised for approx. 20 minutes by means of a tumbler mixer.

The polyamide moulding composition was produced on a twin-shaft extruder of the company Werner & Pfleiderer Type ZSK 25. The dry blend was thereby metered into the feed via metering scales. The glass fibre 1 was conveyed into the melt via side feeder 6 housing units in front of the nozzle. The temperature of the first housing was set at 70° C., that of the remaining housings at 280° C. A speed of rotation of 200 rpm and a throughput of 13 kg/h was used and atmospheric degassing took place. The strands were cooled in the water bath, cut and the obtained granulate was dried at 100° C. for 24 h in a vacuum (30 mbar) to a water content below 0.1% by weight.

Production of the Test Pieces

The test pieces were produced on an injection moulding machine of the company Arburg, Model Allrounder 420C 1000-250. Rising cylinder temperatures of 230° C. to 310° C. were thereby used. The mould temperature was 80° C.

The test pieces were used in the dry state; for this purpose, they were stored after the injection moulding for at least 48 h at room temperature in a dry environment, i.e. over silica gel.

Measuring methods used in this application:
Modulus of elasticity in tension:
ISO 527 with a tensile speed of 1 mm/min
ISO tensile test piece, standard: ISO/CD 3167, Type A1, 170×20/10×4 mm, temperature 23° C.
Tearing strength and breaking elongation:
ISO 527 with a tensile speed of 5 mm/min
ISO tensile test piece, standard: ISO/CD 3167, Type A1, 170×20/10×4 mm, temperature 23° C.
Impact strength according to Charpy:
ISO 179/*eU
ISO test piece, standard: ISO/CD 3167, Type B1, 80×10×4 mm, temperature 23° C.
*1=not instrumented, 2=instrumented
Notch impact strength according to Charpy:
ISO 179/*eA
ISO test piece, standard: ISO/CD 3167, Type B1, 80×10×4 mm, temperature 23° C.
*1=not instrumented, 2=instrumented
Relative viscosity
ISO 307
granulate
0.5 g in 100 ml m-cresol
temperature 20° C.
calculation of the relative viscosity (RV) according to $RV=t/t_0$ following section 11 of the standard.
Melting heat:
ISO standard 11357
granulate
differential scanning calorimetry (DSC) was implemented at a heating rate of 20 K/min.

In the subsequent tables, a comparison of the mechanical properties of examples according to the invention (E2, E4, E6, E8 and E9) and comparative examples (CE1, CE3, CE5, CE7, CE10, CE10, CE11, CE12, CE13 and CE14) is effected with the data of the precise compositions of the individual moulding compositions.

In the examples and comparative examples of tables 1 to 3, the following materials were used:

---

Component A)

| | |
|---|---|
| PA MACM12 | amorphous polyamide MACM12 made of bis-(3-methyl-4-aminocyclohexyl)methane and dodecanedioic acid RV 1.52 (measured with 0.5 g in 100 ml m-cresol at 20° C.) glass transition temperature 155° C. |

-continued

Component B)

PA 12  partially crystalline polyamide 12 made of laurinlactam
RV 1.62 (measured with 0.5 g in 100 ml m-cresol at 20° C.)
melting point 178° C.

Component C)

PA MACM36  amorphous polyamide MACM36 made of bis-(3-methyl-4-aminocyclohexyl)methane (Laromin C260 obtainable from BASF) and dimeric fatty acid with 36 carbon atoms (dimeric fatty acid Radiacid 0970 obtainable from Oleon)
RV 1.54 (measured with 0.5 g in 100 ml m-cresol at 20° C.)
glass transition temperature 76° C.

-continued

PA TMDC36  amorphous polyamide TMDC36 made of bis-(4-amino-3,5-dimethylcyclohexyl)methane, (3,3',5,5'-tetramethyl-4,4',diaminodicyclohexylmethane obtainable from BASF) and dimeric fatty acid with 36 carbon atoms (dimeric fatty acid Radiacid 0970 obtainable from Oleon)
RV 1.53 (measured with 0.5 g in 100 ml m-cresol at 20° C.)
glass transition temperature 92° C.

Component D)

glass fibre 1  Micromax 771 strand
round glass fibre
3 mm long, diameter 6 μm
obtainable from Owens Corning, Belgium glass fibre 2  Nittobo CSG3PA-820
flat glass fibre
3 mm long
main cross-sectional axis 28 μm, subsidiary cross-sectional axis 7 μm
aspect ratio of the cross-sectional axes = 4
obtainable from Nitto Boseki, Japan glass fibre 3  Vetrotex 995 EC10-4.5
round glass fibre
4.5 mm long, diameter 10 μm
obtainable from Saint-Gobain Vetrotex, France Component E)

white pigment  Sachtolith HD-S
zinc sulphide
average particle size (D50) in the range of 0.30 to 0.35 μm
obtainable from Sachtleben Chemie, Germany Component F)

heat stabiliser 1  Irganox 1098
N,N'-hexan-1,6-diylbis-[3-(3,5-di-tert-butyl-4-hydroxyphenylpropionamide,
obtainable from BASF, Germany heat stabiliser 2  Hostanox PAR 24
tris-(2,4-ditert-butylphenyl)phosphite
obtainable from Clariant, Switzerland Tafmer MC201  Olefinic impact modifier, functionalised with maleic anhydride, blend of ethylene/propylene copolymer and ethylene/but-1-ene copolymer in the weight ratio 67:33, grafted with 0.6% by weight of maleic anhydride, obtainable from Mitsui chemicals, Japan.

TABLE 1

| Components | | Unit | CE1 | E2 | CE3 | E4 | CE5 | E6 |
|---|---|---|---|---|---|---|---|---|
| PA MACM12 | A) | % by wt. | 39.65 | 35.65 | 36.7 | 32.7 | 32.7 | 28.7 |
| PA 12 | B) | % by wt. | 10 | 9 | 9.25 | 8.25 | 8.25 | 7.25 |
| PA MACM36 | C) | % by wt. | — | 5 | — | 5 | — | 5 |
| glass fibre 1 | D) | % by wt. | 50 | 50 | 50 | 50 | 55 | 55 |
| white pigment | E) | % by wt. | — | — | 3.7 | 3.7 | 3.7 | 3.7 |
| heat stabiliser 1 | F) | % by wt. | 0.25 | 0.25 | 0.25 | 0.25 | 0.25 | 0.25 |
| heat stabiliser 2 | F) | % by wt. | 0.1 | 0.1 | 0.1 | 0.1 | 0.1 | 0.1 |
| Tests | | | | | | | | |
| modulus of elasticity in tension | — | MPa | 12,180 | 12,240 | 12,980 | 12,830 | 14,650 | 14,520 |
| tearing strength | — | MPa | 165 | 160 | 180 | 175 | 180 | 175 |
| breaking elongation | — | % | 3.1 | 3.7 | 2.9 | 3.2 | 2.4 | 2.7 |
| impact strength Charpy 23° C. | — | kJ/m2 | 58 | 79 | 70 | 78 | 68 | 71 |
| notch impact strength Charpy 23° C. | — | kJ/m2 | 13 | 17 | 13 | 15 | 12 | 14 |

Table 1 shows the positive effect of the addition of polyamide PA MACM36 on the toughness of the unmodified polyamide moulding composition (CE1).

In example E2, the addition of polyamide PA MACM36 to the polyamide moulding composition of comparative example CE1 leads to an improvement in the impact strength from 58 kJ/m² to 79 kJ/m² and the notch impact strength from 13 to 17 kJ/m². Also the breaking elongation is thereby raised from 3.1 to 3.7%. The modulus of elasticity in tension thereby even shows a slight increase.

The comparisons between CE3 and E4 or CE5 and E6 likewise show improvements in impact strength, notch impact strength and breaking elongation. In the case of the modulus of elasticity in tension, only a slight reduction can be observed.

TABLE 2

| | | Unit | CE7 | E8 | E9 |
|---|---|---|---|---|---|
| Components | | | | | |
| PA MACM12 | A) | % by wt. | 36.65 | 34.15 | 34.15 |
| PA 12 | B) | % by wt. | 9 | 6.5 | 6.5 |
| PA MACM36 | C) | % by wt. | — | 5 | — |
| PA TDMC36 | C) | % by wt. | — | — | 5 |
| glass fibre 2 | D) | % by wt. | 50 | 50 | 50 |
| white pigment | E) | % by wt. | 4.0 | 4.0 | 4.0 |
| heat stabiliser 1 | F) | % by wt. | 0.25 | 0.25 | 0.25 |
| heat stabiliser 2 | F) | % by wt. | 0.1 | 0.1 | 0.1 |

TABLE 2-continued

|  | Unit | CE7 | E8 | E9 |
|---|---|---|---|---|
| Tests |  |  |  |  |
| modulus of elasticity in tension | MPa | 13,430 | 13,340 | 13,290 |
| tearing strength | MPa | 175 | 170 | 170 |
| breaking elongation | % | 2.4 | 2.5 | 2.5 |
| impact strength Charpy 23° C. | kJ/m2 | 54 | 75 | 73 |
| notch impact strength Charpy 23° C. | kJ/m2 | 15 | 18 | 18 |

Table 2 shows the positive effect of the addition of polyamide PA MACM36 in example E8 or PA TMDC36 in example E9 on the toughness of the unmodified polyamide moulding composition (CE7).

Both by the addition of PA MACM36 (E8) and by the addition of PA TMDC36 (E9), the impact strengths, notch impact strengths and breaking elongations are increased relative to the measuring values of the comparative variants (CE7). In the case of the moduli of elasticity in tension, only a slight reduction can be observed.

TABLE 3

| Components |  | Unit | CE10 | CE11 | CE12 | CE13 | CE14 |
|---|---|---|---|---|---|---|---|
| PA MACM12 | A) | % by wt. | 29.7 | 28.2 | 26.7 | 25.2 | 23.7 |
| PA 12 | B) | % by wt. | 10 | 9.5 | 9 | 8.5 | 8 |
| Tafmer MC201 |  | % by wt. | — | 2 | 4 | 6 | 8 |
| glass fibre 3 | D) | % by wt. | 60 | 60 | 60 | 60 | 60 |
| heat stabiliser 1 | F) | % by wt. | 0.2 | 0.2 | 0.2 | 0.2 | 0.2 |
| heat stabiliser 2 | F) | % by wt. | 0.1 | 0.1 | 0.1 | 0.1 | 0.1 |
| Tests |  |  |  |  |  |  |  |
| modulus of elasticity in tension |  | MPa | 15,120 | 14,150 | 13,870 | 12,850 | 11,170 |
| tearing strength |  | MPa | 170 | 135 | 125 | 105 | 85 |
| breaking elongation |  | % | 2.3 | 1.6 | 1.6 | 1.4 | 1.2 |
| impact strength Charpy 23° C. |  | kJ/m2 | 72 | 42 | 35 | 28 | 24 |
| notch impact strength Charpy 23° C. |  | kJ/m2 | 14 | 13 | 13 | 12 | 11 |

Table 3 shows the effect of Tafmer MC201—an olefinic impact modifier which is common for polyamides—in a reinforced blend of amorphous and partially crystalline polyamide. The toughness of the polyamide moulding composition is significantly reduced by the addition of the impact modifier, this negative effect increasing with an increasing quantity of impact modifier. The polyamide moulding composition without Tafmer MC201 (CE10) shows an impact strength of 72 kJ/m$^2$, with the addition of 2% by weight of impact modifier (CE11) however only then 42 kJ/m$^2$. The breaking elongation thereby drops from 2.3% (CE10) to only then 1.6% (CE11) and also the notch impact strength drops, in fact from 14 kJ/m$^2$ (CE10) to 13 kJ/m$^2$ (CE11). Furthermore, the stiffness of the polyamide moulding composition drops greatly due to the addition of the impact modifier, as can be detected in the falling modulus of elasticity in tension.

The invention claimed is:

1. A polyamide moulding composition with the following composition:
 A) from 10 to 86% by weight of at least one amorphous polyamide,
 B) from 2 to 30% by weight of at least one partially crystalline aliphatic polyamide,
 C) from 2 to 40% by weight of at least one polyamide formed from a monomer mixture consisting of at least one dimerised fatty acid and a cycloaliphatic amine or a mixture of cycloaliphatic amines, wherein the cycloaliphatic amine or cycloaliphatic amines are selected from the group consisting of bis-(4-amino-3-methylcyclohexyl)methane (MACM), bis-(4-aminocyclohexyl)methane (PACM), bis(4-amino-3-ethylcyclohexyl)methane (EACM), bis-(4-amino-3,5-dimethylcyclohexyl)methane (TMDC), 2,2-(4,4'-diaminodicyclohexyl)propane (PACP) and wherein the at least one dimerised fatty acid has an acid value in the range of 145-210 mg KOH/g,
 D) from 10 to 70% by weight of glass fibres,
 E) from 0 to 40% by weight of particulate fillers and
 F) from 0 to 10% by weight of further additives,
 the quantity proportions of components D) and E) adding up to at most 70% by weight and the quantity proportions of components A) to F) adding up to 100% by weight.

2. The polyamide moulding composition according to claim 1 with the following composition:
 A) from 12 to 61.8% by weight of the at least one amorphous polyamide,
 B) from 5 to 25% by weight of the at least one partially crystalline aliphatic polyamide,
 C) from 3 to 30% by weight of the at least one polyamide C)
 D) from 30 to 69.9% by weight of glass fibres,
 E) from 0.1 to 30% by weight of particulate fillers and also
 F) from 0.1 to 7% by weight of further additives,
 the quantity proportions of components D) and E) adding up to at most 70% by weight, and the quantity proportions of components A) to F) adding up to 100% by weight.

3. The polyamide moulding composition according to claim 1, wherein the at least one dimerised fatty acid has 30 to 50 C atoms.

4. The polyamide moulding composition according to B claim 1, wherein the cycloaliphatic diamine is selected from the group consisting of bis-(4-amino-3-methylcyclohexyl)methane (MACM), bis-(4-amino-3,5-dimethylcyclohexyl)methane (TMDC) and mixtures thereof.

5. The polyamide moulding composition according to claim 1, wherein the cycloaliphatic diamine is selected from the group consisting of bis-(4-amino-3-methylcyclohexyl)

methane (MACM), bis-(4-amino-3,5-dimethylcyclohexyl) methane (TMDC) and mixtures thereof and the dimerised fatty acid has 36 C atoms.

6. The polyamide moulding composition according to claim 1, wherein the amorphous polyamide A) is selected from the group consisting of PA 6I, PA 6I/6T, PA 6I/6T/6NDC, PA MXDI/6I, PA MXDI/XDT/6I/6T, PA MXDI/121, PA MXDI, PA MACM10, PA MACM12, PA MACM14, PA MACM18, PA NDT/INDT, PA TMDC12, PA MACMI/12, PA MACMT/12, PA MACMI/MACM12, PA MACMT/MACM12, PA MACMI/MACMNDC, PA MACMT/MACMNDC, PA MACMI/MACM36, PA MACMT/MACM36, PA MACMI/MACMT/12, PA 6I/MACMI/12, PA 6I/6T/MACMI/MACMT, PA 6I/6T/MACMI/MACMT/12, PA MACM6/11, PA 6I/6T/MACMI/MACMT/MACM12/612, PA MACMI/MACMT/MACM12/12, PA MACMI/MACMT/MACM12, PA 6I/6T/6NDC/MACMI/MACMT/MACMNDC, PA MACM10/10 and mixtures or copolymers thereof, the MACM being able to be replaced up to at most 25% by mol, relative to the sum of the molar proportions of all the monomers of 100% by mol, by PACM, and/or the laurinlactam entirely or partially by caprolactam.

7. The polyamide moulding composition according to claim 1, wherein the at least one partially crystalline aliphatic polyamide is selected from the group consisting of PA 6, PA 46, PA 49, PA 410, PA 411, PA 412, PA 413, PA 414, PA 415, PA 416, PA 418, PA 436, PA 66, PA 69, PA 610, PA 611, PA 612, PA 613, PA 614, PA 615, PA 616, PA 617, PA 618, PA 1010, PA 66/6, PA 6/66/12, PA 6/12, PA 11, PA 12, PA 912, PA 1212, 6T/6I, MXD6, MXD6/MXDI, MXD9, MXD10, MXD11, MXD12, MXD13, MXD14, MXD15, MXD16, MXD17, MXD18, MXD36, PACM9, PACM10, PACM11, PACM12, PACM13, PACM14, PACM15, PACM16, PACM17, PACM18, PACM36, polyether amides, polyether ester amides, polyester amides and mixtures or copolymers thereof.

8. The polyamide moulding composition according to claim 1, wherein the glass fibres are selected from endless fibres and/or short glass fibres with a length of 0.2 to 20 mm.

9. The polyamide moulding composition according to claim 1, wherein the cross-section of the glass fibres is round, the glass fibres having a diameter of 3 to 20 µm.

10. The polyamide moulding composition according to claim 1, wherein the glass fibres are flat glass fibres and have an oval, elliptical, polygonal or rectangular cross-section, the flat glass fibres having at least one of the following properties:
the length of the glass fibres is 3 to 40 µm,
the length of the subsidiary cross-sectional axis is 3 to 20 µm,
the length of the main cross-sectional axis is 6 to 40 µm,
the aspect ratio of the main cross-sectional axis to the subsidiary cross-sectional axis is 1.5 to 8.

11. The polyamide moulding composition according to claim 1, wherein the particulate fillers are selected from the group consisting of talcum, mica, silicates, quartz, wollastonite, kaolin, silicic acids, magnesium carbonate, magnesium hydroxide, chalk, ground or precipitated calcium carbonate, lime, feldspar, inorganic pigments, barium sulphate, zinc oxide, zinc sulphide, lithopones, titanium dioxide, rutile, anatase, iron oxide, iron-manganese oxide, metal oxides, spinels, copper-iron spinel, copper-chromium oxide, zinc-iron oxide, cobalt-chromium oxide, cobalt-aluminium oxide, magnesium-aluminium oxide, copper-chromium-manganese mixed oxides, copper-manganese-iron mixed oxides, rutile pigments, titanium-zinc rutile, nickel-antimony titanate, chromium-antimony titanate, hard- or soft- magnetic metals or alloys or ceramics, hollow spherical silicate fillers, aluminium oxide, boron nitride, boron carbide, aluminium nitride, calcium fluoride and mixtures thereof.

12. The polyamide moulding composition according to claim 1, wherein the further additives are selected from the group consisting of stabilisers, age-protecting agents, antioxidants, antiozonants, light-stability agents, UV stabilisers, UV absorbers, UV blockers, inorganic heat stabilisers, stabilisers based on copper halides and alkali halides, organic heat stabilisers, conductivity additives, carbon black, optical brighteners, processing aids, nucleation agents, crystallisation accelerators, crystallisation inhibitors, flow aids, lubricants, mould-release agents, plasticisers, pigments other than white pigments, colourants, marking materials and mixtures thereof.

13. The polyamide moulding composition according to claim 1 wherein the polyamide moulding composition is free of olefinic impact modifiers.

14. A method for production of parts of an electrical or electronic component, of a housing or of a housing component household appliances, household machines, devices and apparatus for telecommunication and consumer electronics, interior and exterior parts in the automobile sector and in the field of other transport means, interior and exterior parts in the field of electrics, furniture, sport, mechanical engineering, the sanitary and hygiene field, medicine, energy- and actuation technology, comprising utilizing the polyamide moulding composition in accordance with claim 1 in the moulding of the parts.

15. The polyamide moulding composition according to claim 2, wherein the at least one dimerised fatty acid has 30 to 50 C atoms.

16. The polyamide moulding composition according to claim 2, wherein the cycloaliphatic diamine selected from the group consisting of bis-(4-amino-3-methylcyclohexyl) methane (MACM), bis-(4-amino-3,5-dimethylcyclohexyl) methane (TMDC) and mixtures thereof.

17. The polyamide moulding composition according to claim 2, wherein the cycloaliphatic diamine is selected from the group consisting of bis-(4-amino-3-methylcyclohexyl) methane (MACM), bis-(4-amino-3,5-dimethylcyclohexyl) methane (TMDC) and mixtures thereof and the dimerised fatty acid has 36 C atoms.

18. The polyamide moulding composition according to claim 2, wherein the amorphous polyamide A) is selected from the group consisting of PA 6I, PA 6I/6T, PA 6I/6T/6NDC, PA MXDI/6I, PA MXDI/XDT/6I/6T, PA MXDI/121, PA MXDI, PA MACM10, PA MACM12, PA MACM14, PA MACM18, PA NDT/INDT, PA TMDC12, PA MACMI/12, PA MACMT/12, PA MACMI/MACM12, PA MACMT/MACM12, PA MACMI/MACMNDC, PA MACMT/MACMNDC, PA MACMI/MACM36, PA MACMT/MACM36, PA MACMI/MACMT/12, PA 6I/MACMI/12, PA 6I/6T/MACMI/MACMT, PA 6I/6T/MACMI/MACMT/12, PA MACM6/11, PA 6I/6T/MACMI/MACMT/MACM12/612, PA MACMI/MACMT/MACM12/12, PA MACMI/MACMT/MACM12, PA 6I/6T/6NDC/MACMI/MACMT/MACMNDC, PA MACM10/10 and mixtures or copolymers thereof, the MACM being able to be replaced up to at most 25% by mol, relative to the sum of the molar proportions of all the monomers of 100% by mol, by PACM, and/or the laurinlactam entirely or partially by caprolactam.

19. The polyamide moulding composition according to claim 2, wherein the at least one partially crystalline aliphatic polyamide is selected from the group consisting of PA 6, PA 46, PA 49, PA 410, PA 411, PA 412, PA 413, PA 414, PA 415, PA 416, PA 418, PA 436, PA 66, PA 69, PA 610, PA 611, PA 612, PA 613, PA 614, PA 615, PA 616, PA 617, PA 618, PA 1010, PA 6616, PA 6/66/12, PA 6/12, PA 11, PA 12, PA 912, MXD10 MXD11 PA 1212, 6T/6I, MXD6, MXD6/MXDI, MXD9, MXD10, MXD11, MXD12, MXD13 MXD14, MXD15, MXD16, MXD17, MXD18, MXD36, PACM9, PACM10, PACM11 PACM12, PACM13, PACM14, PACM15, PACM16, PACM17, PACM18, PACM36, polyether amides, polyether ester amides, polyester amides and mixtures or copolymers thereof.

20. The polyamide moulding composition according to B claim 2, wherein the glass fibres are selected from endless fibres and/or short glass fibres with a length of 0.2 to 20 mm.

* * * * *